United States Patent [19]

Escaravage

[11] Patent Number: 4,848,796
[45] Date of Patent: Jul. 18, 1989

[54] DEVICE FOR ADJUSTING THE POSITION OF A STRAP RETURN ELEMENT OF A VEHICLE SAFETY BELT

[75] Inventor: Gerard Escaravage, Valentigney, France

[73] Assignee: ECIA-Equipements ET Composants Pour L'Industrie Automobile, Audincourt, France

[21] Appl. No.: 208,535

[22] Filed: Jun. 20, 1988

[30] Foreign Application Priority Data

Jun. 19, 1987 [FR] France ................................ 87 08636

[51] Int. Cl.⁴ ............................................ B60R 22/20
[52] U.S. Cl. .................................... 280/808; 280/801; 280/804; 297/483
[58] Field of Search .................... 280/808, 801, 804; 297/483, 468, 470, 476, 480

[56] References Cited

U.S. PATENT DOCUMENTS

| | | | |
|---|---|---|---|
| 3,964,798 | 6/1976 | Burleigh | 280/808 |
| 4,538,832 | 9/1985 | Anderson | 280/808 |
| 4,550,933 | 11/1985 | Patterson | 280/808 |
| 4,652,012 | 3/1987 | Biller et al. | 280/808 |
| 4,702,494 | 10/1987 | Escaravage | 280/808 |

FOREIGN PATENT DOCUMENTS 2460092 6/1976 Fed. Rep. of Germany.
3112458 10/1982 Fed. Rep. of Germany.

Primary Examiner—Richard A. Bertsch
Attorney, Agent, or Firm—Sughrue, Mion, Zinn, Macpeak & Seas

[57] ABSTRACT

The device comprises a guide rail (1) fixed to a post of the vehicle and including an opening (3) in which is movable a fixing pin (4) of the strap return element (5). This pin has a base (10). An element (11) constituting a lock and defining an opening (12) having a generally S-shape and a width less than the dimension of the base (10) of the pin (4), is provided between the base and the rail (1) and mounted to be movable by control means (13, 14) between a first locking position in which the two ends of the S-shaped opening (12) of the element (11) are in confronting relation to the opening (3) of the rail (1) so as to define two apertures for locking the pin (4) in position, and a second position for shifting the pin (4) and the return element, in which the rest of the S-shaped opening (12) of the element (11) is in confronting relation to the opening (3) of the rail (1) to permit the shifting of the pin (4) and the return element. Resilient means (15, 16) are provided for biasing the element (11) constituting a lock to the locking position thereof.

6 Claims, 1 Drawing Sheet

DEVICE FOR ADJUSTING THE POSITION OF A STRAP RETURN ELEMENT OF A VEHICLE SAFETY BELT

BACKGROUND OF THE INVENTION

The present invention relates to a device for adjusting the position of a strap return element, of in particular a safety belt for an automobile vehicle.

On most vehicles, this strap return element is disposed on an anchoring member fixed to the body of the vehicle at a height suitable for the majority of users of normal size.

However, this height is unsuitable for certain users and in particular persons of small size.

In order to solve this problem, a number of devices are known in the art for adjusting the height of this strap return element.

For example, there is known from the document FR 2 484 343 a device for adjusting the height of an anchoring point of a safety belt in which a slide moves along a screw-threaded support rod within the range of adjustment of the anchoring, said rod being rotatively mounted between the walls of a case fixed to an element of the body of the vehicle. The front side of this slide carries a member for anchoring the belt and its rear side carries an element for preventing the rotation of the slide which guides it along the inner wall of the case.

A device is also known from the document FR 2 488 201 for adjusting the height of a return element of a vehicle safety belt, comprising an adjusting element carrying the return element with a lock which engages in stop notches of a rectilinear guide, the lock being capable of being disengaged by an operating mechanism.

A device is also known from the document FR 2 482 539 for adjusting the anchoring point of a safety belt disposed above the shoulder of an occupant of a vehicle, in which the anchoring point is carried by a slideway cursor movably mounted in a slideway and held in position by a pawl which cooperates with a series of orifices provided in the slideway.

The document FR 2 513 887 discloses a device for adjusting the height of the upper member of a shoulder strap of a safety belt. This device comprises a slideway mounted on the body of the vehicle and provided with a guide slot and cavities in which enters at least one locking member mounted on a slide which carries the member of the shoulder strap and is lockable and unlockable by a manual operating element.

The document FR 2 543 838 discloses an anchoring device for the upper point of a safety belt, comprising a rail having a plurality of apertures which are in two parts, and a locking lug which is controlled by an operating knob. The adjustment of the position of the anchoring point is achieved by extracting the lug from the aperture, shifting the slide and re-introducing the lug in another aperture.

Lastly, the document FR 2 536 288 discloses a device for adjusting the height of a safety belt for an automobile vehicle, comprising a guiding slideway having two sides, locking openings disposed one above the other, and a carriage which is movable in the slideway, this carriage carrying a fixing or return member of the belt and including stop elements which may be transversely shifted relative to the direction of movement of the carriage by a button in opposition to the action of a spring for changing from a locking position to an unlocking position.

However, all these devices have a number of drawbacks, in particular as concerns the possibility of adjustment, their relatively complex structure and consequently their relatively high manufacturing and mounting costs.

Furthermore, in most of the known devices, the locking elements are biased to their locking position by resilient means which exert thereon a relatively large maintaining force. This obliges the user who desires to shift the strap return element to exert on the elements for shifting the locking means a relatively great force for shifting the locking means to their retracted position and thereby permit the shifting of the strap return element.

SUMMARY OF THE INVENTION

An object of the invention is therefore to solve the aforementioned problems by providing a simple, rapid and precise device for adjusting the position of the strap return element so as to adapt the strap to the morphology of the user.

The invention therefore provides a device for adjusting the position of a strap return element, of in particular an automobile vehicle safety belt, between two end positions, of the type comprising a guide rail fixed to the post of the vehicle and including an opening in which is movable a fixing pin of the return element, said pin including a base, wherein an element constituting a lock and defining an opening having a generally S-shape and a width less than the dimension of said base, is provided between said base and the rail and is mounted to be movable by control means between a first locking position in which the two ends of the S-shaped opening of the element constituting a lock are in confronting relation to the opening of the rail so as to define two apertures for locking the pin of the return element in position corresponding to said end positions, and a second position for shifting the return element in which the remainder of the S-shaped opening of the element constituting a lock is in confronting relation to the opening of the rail to permit the shifting of the pin and therefore of the return element, resilient means being provided for biasing the element constituting a lock to the locking position thereof.

A better understanding of the invention will be had from the following description which is given solely by way of example with reference to the accompanying drawings, in which:

DETAILED DESCRIPTION OF A PREFERRED EMBODIMENT

Figures 1, 2:
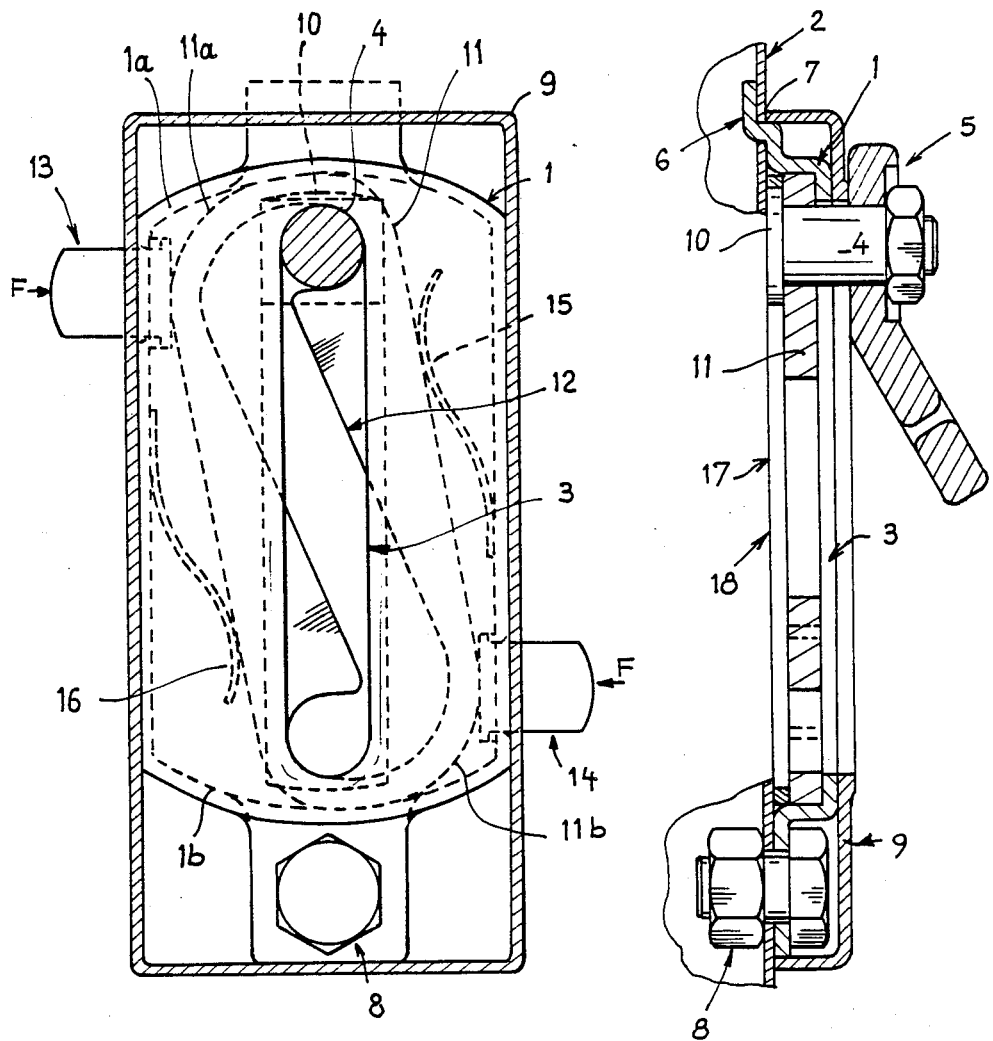
FIG. 1 is a sectional view of a device according to the invention.
FIG. 2 is a front elevational view of a device according to the invention.

As can be seen in the Figures, a device for adjusting the position of a strap return element of in particular an automobile vehicle safety belt according to the invention, comprises a guide rail 1 in the form of a bottomless case fixed to the post 2 of the automobile vehicle and defining an opening 3 which is, for example, rectilinear, in which is movable a fixing pin 4 of the strap return element 5.

The rail 1 is fixed to the post 2 of the vehicle, for example in the upper part of the latter, by a bent portion 6 of the rail which engages in an opening 7 in the post and, in its lower part, by a screw-and-nut system 8. A cover 9 of known type may also be provided around the assembly to improve the appearance of the latter.

The fixing pin 4 of the return element 5 has a base 10 which is for example of square shape and an element constituting a lock 11 is disposed between this base and the rail 1, aas shown more particularly in FIG. 1. This element constituting a lock 11 defines an opening 12 (FIG. 2) which has a generally S-shape and a width which is less than the dimension of the base 10 of the fixing pin 4 of the return element for holding this pin in the rail. This element constituting a lock is mounted to be movable by control means, for example 13 and 14, between a first locking position shown in FIG. 2 in which the two ends of the S-shaped opening 12 of the element constituting a lock are in confronting relation to the opening 3 of the rail so as to define two apertures for locking the pin of the return element in position, corresponding to the two end locking positions, and a second position for shifting the pin and the return element, in which the rest of the opening 12 of the element 11 constituting a lock is in confronting relation to the opening 3 of the rail 1 to permit the shifting of the pin and return element.

Resilient means 15, 16 are provided for biasing the element 11 constituting a lock to the locking position thereof.

The control means 13 and 14 are formed by two control elements disposed on each side of the rail in the upper part and lower part of the latter, as shown in FIG. 2. These control elements are adapted to cooperate with a respective edge of the element 11 constituting a lock for shifting the latter to the position for shifting the pin 4. The resilient means 15 and 16 are disposed between the element 11 constituting a lock and the edges of the rail on the side remote from the corresponding control elements 13 and 14 respectively.

Advantageously, these resilient means 15, 16 may be formed by resilient strips which are bent and have an end which is for example connected to the rail and an opposite end which bears against the element 11 constituting a lock.

Advantageously, the ends of the element 11 constituting a lock, i.e. the portions 11a and 11b thereof, are rounded and adapted to cooperate with portions of complementary shape 1a and 1b of the rail in order to facilitate the shifting of the element 11 constituting a lock between the two positions thereof.

At rest, the resilient means bias the element 11 constituting a lock to the locking position thereof, as shown in FIG. 2. When the user desires to shift the strap return element to the lower position or to the upper position, he exerts on the control means 13 and 14 a force indicated by the arrows F in FIG. 2 so as to depress the control elements 13 and 14 and shift the element 11 constituting a lock to the position for shifting the pin in which the latter is free to move along the opening 3 of the rail.

Note that a guide plate 17 may be provided between the element 11 constituting a lock and the post 2 of the vehicle, this plate defining a guide opening 18 adapted to receive the base 10 of the pin 4 of the return element for facilitating the shifting of the pin and return element and reducing noise produced in this region.

The strap return element is thus locked in position in a very reliable manner and the forces F to be exerted by the user when he desires to shift this return element are reduced owing to the fact that the resilient strips merely have to ensure a return of the element 11 constituting a lock to the locking position and the locking proper is ensured independently of these resilient means by the element 11 constituting a lock.

Indeed, the structure of this element constituting a lock is such that the greater the pull exerted on the return element 5 the more efficient is the locking.

What is claimed is:

1. A device for adjusting the position of a strap return element of a safety belt two end positions, said device comprising:
   a guide rail for fixing to a post of a vehicle and defining an opening in the form of a rectilinear slot;
   a fixing pin of the return element, said pin having a base and a stem engaged through said slot and slidingly movable therein in a plane parallel to said base;
   an element constituting a lock defining an opening which has a generally S-shape, with curved ends linked to an intermediate portion, and a width less than the dimension of said base for receiving said stem and mounted between said base and said rail and pivotably movable in a plane parallel to said base between a first locking position, in which said two curved ends of the S-shaped opening are in confronting relation to said slot so as to define two apertures for selectively capturing and locking said pin in either of two positions corresponding to said end positions, and a second releasing position in which said intermediate portion of the S-shaped opening is in confronting relation to said slot for shifting said pin and return element;
   resilient means associated with said lock for biasing the later to said first locking position thereof; and
   control means associated with said lock for rocking the latter toward its said second position against the bias of said resilient means.

2. A device according to claim 1, comprising a guide plate defining a guide opening for the base of said pin for interposing between the element constituting a lock and the post of the vehicle.

3. A device according to claim 1, wherein the control means comprise two control elements disposed on opposite sides of the rail in an upper part and a lower part of the rail and each cooperative with a respective edge of the element constituting a lock for shifting the element constituting a lock to the position for shifting said pin and strap return element.

4. A device according to claim 1, wherein the resilient means are disposed between the element constituting a lock and the rail on a side of the element constituting a lock which is remote from the corresponding control means.

5. A device according to claim 1, wherein the resilient means comprise bent resilient strips having one end connected to the rail and an opposite end bearing against the element constituting a lock.

6. A device according to claim 1, wherein the ends of the element constituting a lock are rounded and portions of complementary shape of the rail are cooperative with the rounded ends of the element constituting a lock.

* * * * *